No. 839,502. PATENTED DEC. 25, 1906.
E. W. MYERS.
ELECTRIC MOTOR.
APPLICATION FILED MAR. 21, 1905.

2 SHEETS—SHEET 1.

WITNESSES:
Ralph Lancaster
Russell M. Everett

INVENTOR
Eugene Wallace Myers
BY
Charles H. Pell,
ATTORNEY.

No. 839,502. PATENTED DEC. 25, 1906.
E. W. MYERS.
ELECTRIC MOTOR.
APPLICATION FILED MAR. 21, 1905.

2 SHEETS—SHEET 2.

WITNESSES:
Ralph Lancaster
Russell M. Everett

INVENTOR:
Eugene Wallace Myers
BY
Charles H. Hill,
ATTORNEY.

UNITED STATES PATENT OFFICE.

EUGENE W. MYERS, OF BLOOMFIELD, NEW JERSEY.

ELECTRIC MOTOR.

No. 839,502.

Specification of Letters Patent.

Patented Dec. 25, 1906.

Application filed March 21, 1905. Serial No. 251,193.

*To all whom it may concern:*

Be it known that I, EUGENE W. MYERS, a citizen of the United States, residing at Bloomfield, in the county of Essex and State of New Jersey, have invented certain new and useful Improvements in Electric Motors; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The objects of this invention are to secure an improved field for electric motors, to obtain such a construction of the field as will admit of the use of a chill in casting the same, to thus avoid machine-work upon the fields and lessen the labor and cost of producing them, to obtain maximum efficiency in the field and reduce its reluctance, to avoid projecting pole-pieces upon the field, to secure a construction in which the disposition of metal facilitates the passage of the lines of force from pole to pole, to obtain the shortest possible path for the lines of force through said field, to split or divide the field in such a place as to not interfere with the field strength, to obtain a motor in which the field-coils can be placed in either series or multiple with each other, and to obtain other advantages and results, some of which may be hereinafter referred to in connection with the description of the working parts.

The invention consists in the improved electric motor and in the arrangements and combinations of parts of the same, all substantially as will be hereinafter set forth, and finally embraced in the clauses of the claim.

Figure 1:
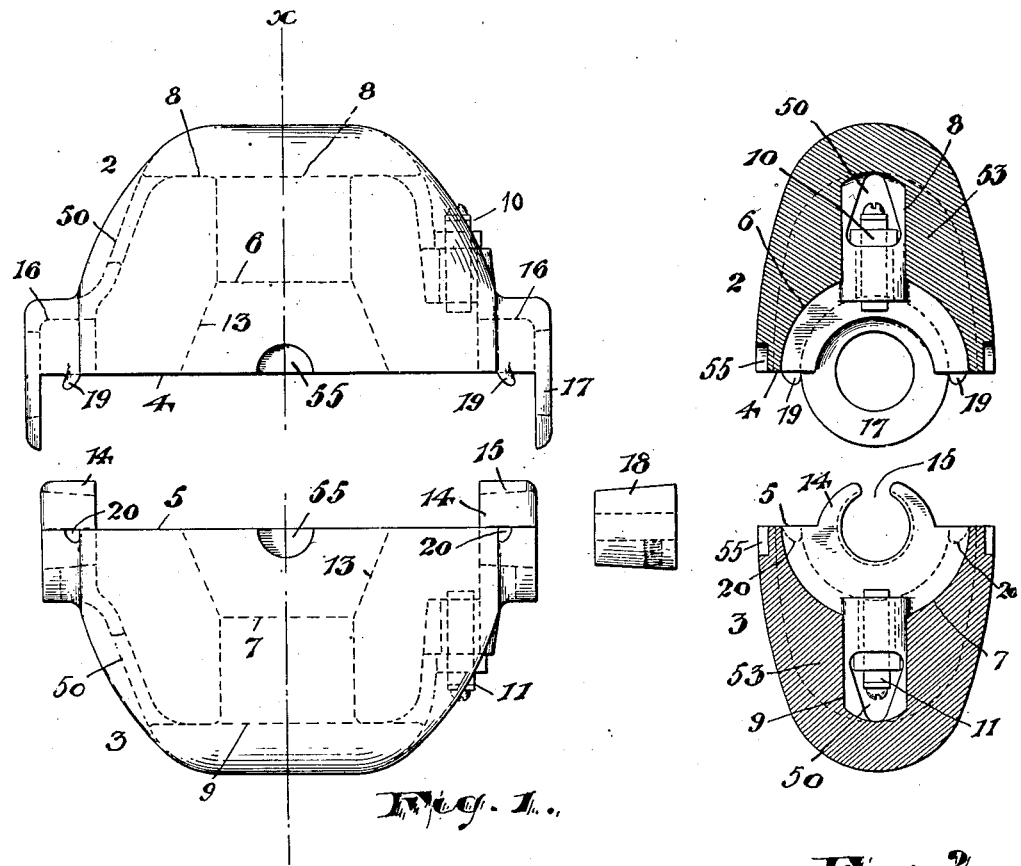
Figure 2:
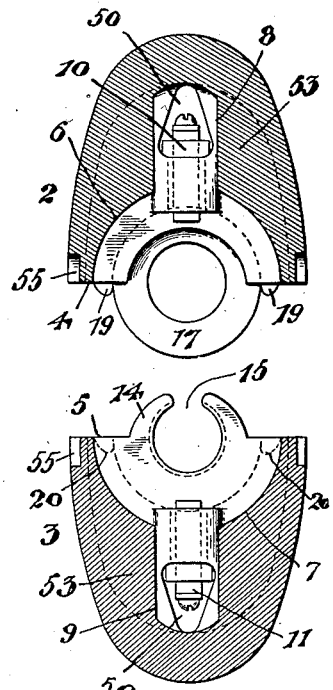
Figure 3:
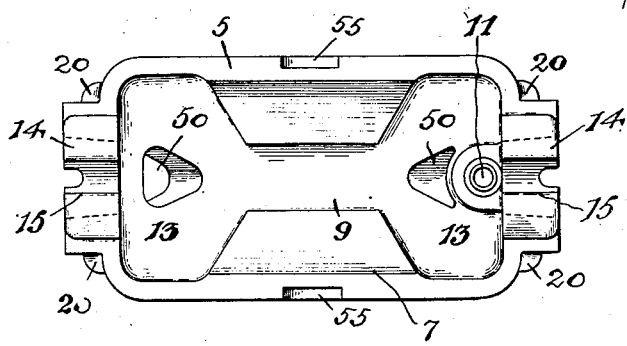
Figure 4:
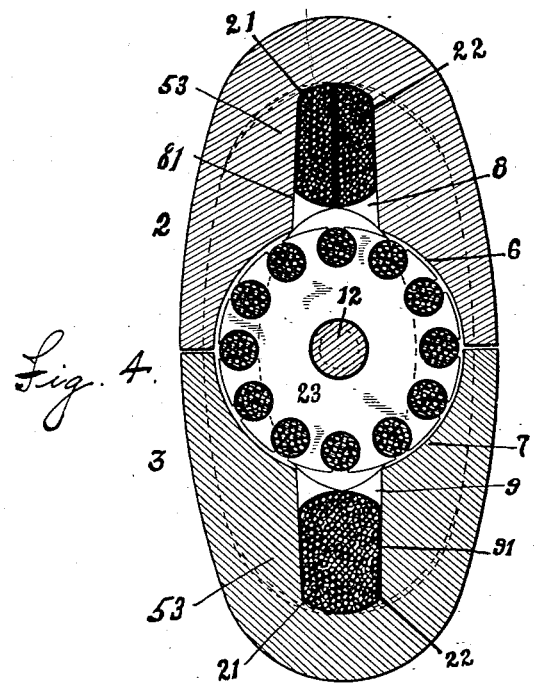
Figure 5:
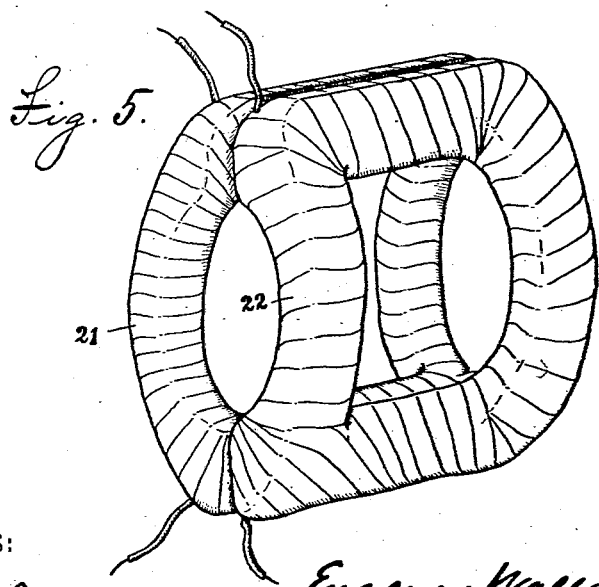

Referring to the accompanying drawings, in which like characters of reference indicate corresponding parts in each of the several figures, Figure 1 is a side elevation of the field of my improved motor with its parts separated. Fig. 2 is a cross-section of the same upon line *x*, Fig. 1; and Fig. 3 is a plan view of the lower section of the field. Fig. 4 is a transverse section of the motor complete, and Fig. 5 is a perspective view of the field-coils.

In said drawings, 2 3 indicate the upper and lower sections, respectively, of the field of my improved motor, adapted to come together at their faces 4 5 and being hollowed or recessed at said faces to receive the armature 23, as at 6 7, respectively. In the bottoms of said armature-recesses 6 7 are other recesses 8 9, which receive the field-coils, hereinafter described. The said recesses 8 and 9 have straight side walls, preferably flaring slightly outward, as at 81 and 91 in Fig. 4, and thus each field-section can be cast upon a chill, so that its inner surfaces are smooth and require no machine-work in finishing.

Each field-section preferably has at the opposite ends of its recess 8 (or 9) for the field-coil openings or holes 50, adapted to ventilate the interior chamber and keep the same cool. Furthermore, a crack may be left, if desired, where the faces 4 5 of the two sections come together adjacent to the armature-coil for a similar purpose.

At one end of the motor each section is provided with a brush 10 or 11, mounted in any ordinary and well-known manner to engage the commutator. Furthermore, the adjacent faces 4 5 of the field-sections form at the opposite ends of the armature spaces 13 for the shaft 12, commutator 51, and field-coils 21 22.

For connecting the two field-sections 2 and 3 the lower one is preferably provided with circular ends 14, which project upward above the face 5 of the section and are slotted, as at 15, to permit the passage of the shaft 12 in assembling the motor. Said ends 14 are adapted to fit into recesses 16 in the upper field-section, and said upper section has outer end disks 17, projecting downward from the face 4 and adapted to lap over at their outer sides the end parts 14 of the lower section just described. Both said upper and lower parts 14 and 17 of each pair are apertured to receive a tapered bushing 18, which is adapted to be forced into place to connect the field-sections, and which bushings afford bearings for the armature-shaft 12. Preferably the castings of my improved field are of malleable iron, and the upper section is provided with lugs or feet 19, projecting beyond the face 4 of the section and adapted to engage bearings 20 upon the other section. Said bearings are preferably inclined or flaring, as shown, and the lugs 19 are cast in even more flaring position, so that when the sections have been fitted properly together and the bushings 18 inserted the said lugs may be struck down onto their seats with a hammer and a stable bearing between the two sections secured.

Oil-cups 52 of any ordinary construction project up through the ends 15 of the lower field-section and are screwed into the bushings 18, thus serving not only to hold their wicks against the shaft 12, but also to prevent the said bushings 18 from slipping out of place.

The coils 21 22 are preferably employed in my improved motor, the same being joined at either the top or bottom, as shown in Figs. 4 and 5, and split or separated at the opposite side to pass the shaft 12 in assembling. These coils are bent or formed, as shown in Fig. 5, to lie in the recesses 8 and 13, provided therefor, as shown in Fig. 4, and it will be observed that by this construction there are no projecting pole-pieces, but the poles are located at the centers of the opposite flat sides of the motor. Thus the lines of force passing between said poles pass through the thick body of metal at the upper and lower edges of the field, as at 53 in Fig. 4, so that their passage is facilitated and the reluctance of the field reduced. Furthermore, the line of division of the sections 2 3 of the field lies at the middle of each pole-piece where the lines of force are least effective, and thus there is the least loss or interruption of said lines.

Having thus described the invention, what I claim as new is—

1. A field for electric motors, comprising two sections having faces adapted to lie flatwise together, each section having in its said face a longitudinally-disposed trough-like chamber, and in the floor of said chamber a longitudinal groove or recess disposed in a plane substantially perpendicular to the face of the section, and having its side walls flaring outward.

2. A field for electric motors, comprising two sections having faces adapted to lie flatwise together, each section having in its said face a longitudinally-disposed trough-like chamber, and in the floor of said chamber a longitudinal groove or recess with outwardly-flaring side walls.

3. In an electric motor, the combination of an armature and its shaft, a field comprising sections on opposite sides of said armature, said sections having perforated overlapping projections perpendicular to the shaft, and bushings adapted to be inserted in said overlapping projections and being in turn perforated to receive the shaft.

4. In an electric motor, the combination of an armature and its shaft, a field comprising sections on opposite sides of said armature, said sections having perforated overlapping projections perpendicular to the shaft, bushings adapted to be inserted in said overlapping projections and being in turn perforated to receive the shaft, and oil-cups extending through one of said projections and through the bushing, transversely of the shaft.

5. In an electric motor, the combination of an armature and its shaft, a field comprising sections on opposite sides of said armature, one of said sections having bearing-surfaces inclined to the plane of division of the sections and the other having malleable lugs adapted to engage said bearings, and means for joining said sections together.

6. In an electric motor, the combination of an armature and its shaft, a field composed of opposite sections adapted to lie one on each side of said shaft, said sections having one perforated annular projections and the other section having recesses to receive said projections on the first-mentioned section and perforated annular projections of its own adapted to overlap said first-mentioned projections, the projections of one section being slotted to permit the passage of the armature-shaft, and bushings adapted to be inserted in said perforated projections upon the shaft.

In testimony that I claim the foregoing I have hereunto set my hand this 11th day of March, 1905.

EUGENE W. MYERS.

Witnesses:
RUSSELL M. EVERETT,
M. V. DOYLE.